(12) United States Patent
Cho (10) Patent No.: US 7,004,884 B2
(45) Date of Patent: Feb. 28, 2006

(54) POWERTRAIN SYSTEM OF HYBRID ELECTRIC VEHICLE

(75) Inventor: Sung Tae Cho, Hwaseong (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/734,896

(22) Filed: Dec. 11, 2003

(65) Prior Publication Data

US 2005/0009665 A1    Jan. 13, 2005

(30) Foreign Application Priority Data

Jul. 7, 2003    (KR) ............. 10-2003-0045717

(51) Int. Cl.
    *B60K 1/02* (2006.01)
(52) U.S. Cl. .......................................... 477/3
(58) Field of Classification Search ............... 74/661; 180/65.2; 475/5; 477/3, 5
    See application file for complete search history.

(56) References Cited

U.S. PATENT DOCUMENTS

| | | | |
|---|---|---|---|
| 6,499,370 B1 * | 12/2002 | Bowen | 74/330 |
| 6,740,002 B1 * | 5/2004 | Stridsberg | 477/14 |

FOREIGN PATENT DOCUMENTS

| | | |
|---|---|---|
| JP | 10-327504 | 12/1998 |
| JP | 2000-094973 | 4/2000 |
| JP | 2000-108694 | 4/2000 |
| JP | 2000-142134 | 5/2000 |
| JP | 2000-142139 | 5/2000 |
| JP | 2001-206108 | 7/2001 |
| JP | 2002-211250 | 7/2002 |
| JP | 2002-262409 | 9/2002 |
| JP | 2002-281607 | 9/2002 |

* cited by examiner

*Primary Examiner*—Dirk Wright
(74) *Attorney, Agent, or Firm*—Morgan Lewis & Bockius LLP

(57) ABSTRACT

Shift performance of a powertrain system of a hybrid electric vehicle is enhanced by a powertrain system including a clutch, a primary motor, an automated shift gearbox (ASG) connected to the engine interposing the clutch, a secondary motor; and a differential gearbox, wherein the primary motor is disposed between an output shaft of the clutch and an input shaft of the ASG, and the secondary motor is disposed between an output shaft of the ASG and an input shaft of the differential gearbox.

5 Claims, 7 Drawing Sheets

POWERTRAIN SYSTEM OF HYBRID ELECTRIC VEHICLE

CROSS-REFERENCE TO RELATED APPLICATIONS

This application claims priority of Korean Application No. 10-2003-004 5717, filed on Jul. 7, 2003 reference.

FIELD OF THE INVENTION

Generally, the present invention relates to a powertrain system for a hybrid electric vehicle, and more specifically, to control of an automated shift gearbox in such a system.

BACKGROUND OF THE INVENTION

In general, a hybrid electric vehicle (HEV) uses two power sources, an internal combustion engine and electric motor. This is the feature of the HEV that differentiates it from a conventional vehicle using only an internal combustion engine. An appropriate powertrain system and shift control technique must therefore be provided for the HEV, so that power transmission of the two power sources may be smoothly maintained.

In conventional schemes for powertrain systems for such HEVs, power from the engine and power from the electric motor are not perfectly separated. Therefore, an optimum electric drive mode is very difficult to realize. In addition, inertial and/or frictional loads of the engine are active under regenerative braking, which may deteriorate efficiency of the regenerative braking.

In particular, because a clutch in a conventional HEV receives both the power of the engine and the power of the electric motor, the clutch is required to have a large torque capacity. Therefore, a hydraulic pump for controlling engagement of the clutch also must have a large capacity in order to ensure sufficient torque for engaging the clutch at a low speed (i.e., at a low shift-speed), which decreases overall efficiency of power of the vehicle.

Considering that a continuously variable transmission (CVT) is usually limited in its torque capacity, it is generally not appropriate for use as a transmission in an HEV, especially for a vehicle larger than a middle-sized sedan that has a relatively powerful engine. When a CVT is used for such a larger sedan, the CVT may experience slippage because of excessive torque.

As an alternative, an automated shift gearbox (ASG) has been proposed as a transmission for an HEV. In this case, an appropriate scheme of the powertrain and algorithm for controlling shift operation thereof must be newly designed in order to obviate shift-shock and/or a period of no power transmission.

Figure 7:
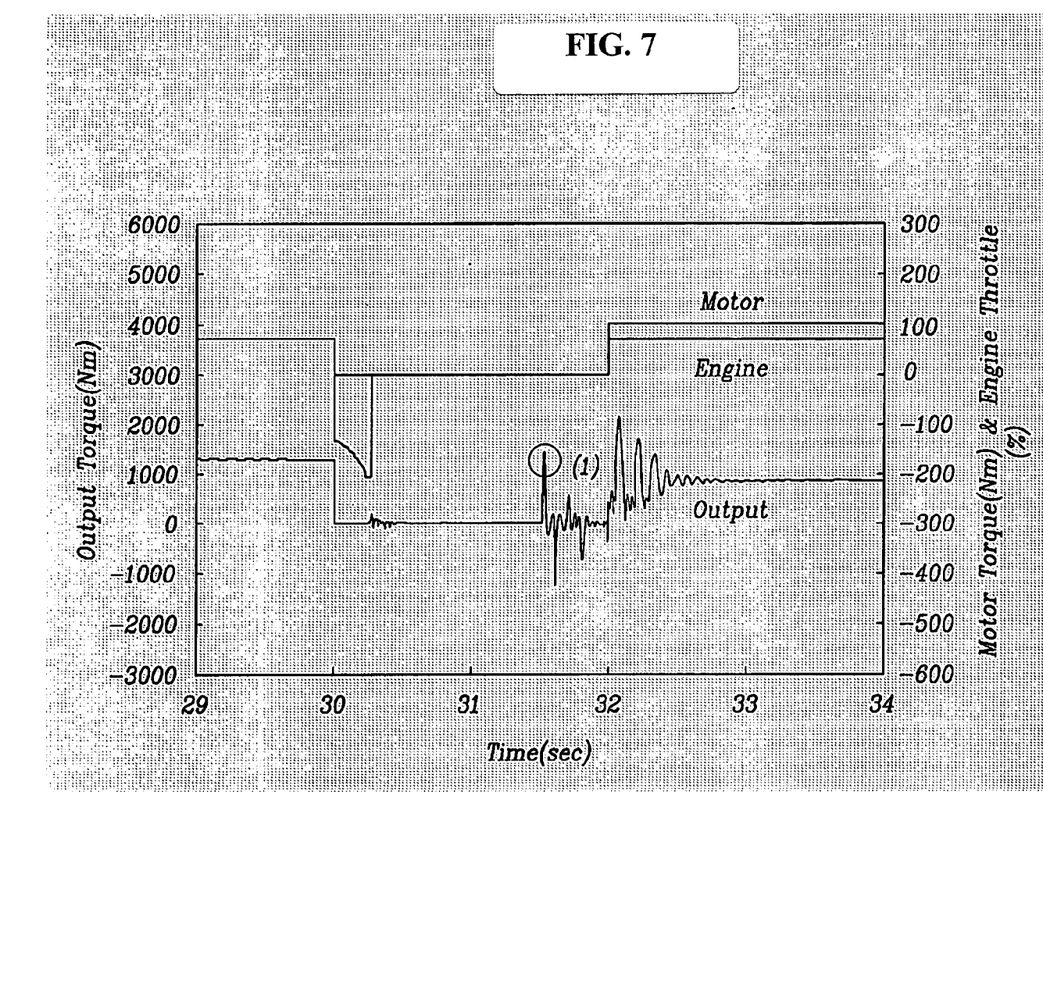
FIG. 7 is a graph for illustrating a shift-shock of an HEV having an ASG transmission that is conventionally controlled.

FIG. 7 is a graph illustrating a shift-shock of an HEV having an ASG transmission that is conventionally controlled. As shown therein, a starting point of a shift operation, power from all power sources is separated from drive wheels, which causes output torque of the vehicle to abruptly become zero (0). In addition, a transient shift-shock may occur at a point of engagement of synchronizers, i.e., at a point of engagement of a shift-speed, (refer to circle 1), and also at a point of an engagement of the clutch. Since such a shift-shock is caused by a schematic structure of the powertrain system, the structure of a powertrain system and/or an algorithm for its shift operation should be newly designed to eliminate such a shift-shock.

The information disclosed in this Background of the Invention section is only for enhancement of understanding of the background of the invention and should not be taken as an acknowledgement or any form of suggestion that this information forms the prior art that is already known to a person skilled in the art in this country.

SUMMARY OF THE INVENTION

Embodiments of the present invention provide a powertrain system for a hybrid electric vehicle that includes non-limiting advantages of enhanced shift performance. An exemplary powertrain system of a hybrid electric vehicle (HEV) according to an embodiment of the present invention includes an engine, a clutch, primary and secondary motors, an automated shift gearbox (ASG) connected to the engine and interposing the clutch therebetween, and a differential gearbox. The primary motor is disposed between an output shaft of the clutch and an input shaft of the ASG. The secondary motor is disposed between an output shaft of the ASG and an input shaft of the differential gearbox.

In a further embodiment, an exemplary powertrain system of an HEV according to an embodiment of the present invention includes a controller executing a shift operation by controlling the engine, the clutch, the primary and secondary motors, and the ASG. The controller adjusts outputs of the engine and the primary and secondary motors during the shift operation.

In a yet further embodiment, the controller executes a clutch disengagement mode during the shift operation. The clutch disengagement mode includes controlling an output torque of the engine during a disengagement of the clutch such that the output torque of the engine lies within a predetermined torque capacity of the clutch, controlling a rotation speed of the engine after the disengagement of the clutch such that the rotation speed of the engine is synchronized with a rotation speed of the output shaft of the clutch at a target shift-speed, and controlling the primary and secondary motor such that a required torque is output through the input shaft of the differential gearbox.

In a yet further embodiment, the controller executes a current shift-speed release mode during the shift operation, wherein the current shift-speed release mode. includes disengaging a current shift-speed of the ASG after the disengagement of the clutch, and controlling, when the current shift-speed is disengaged, a rotation speed of the input shaft of the ASG using the primary motor such that the rotation speed of the input shaft of the ASG is synchronized with one at the target shift-speed.

In a yet further embodiment, the controller executes a target shift-speed engagement mode during the shift operation, wherein the target shift-speed engagement mode includes engaging the target shift-speed after the rotation speed of the input shaft of the ASG is synchronized with the one at the target shift-speed, and controlling, after the engaging the target shift-speed, the primary and secondary motors such that the required torque is output through the input shaft of the differential gearbox.

In a yet further embodiment, the controller executes a shift finishing mode during the shift operation, wherein the shift finishing mode includes engaging the clutch after the target shift-speed is engaged and the rotation speed of the engine is synchronized with the rotation speed of the output shaft of the clutch at a target shift-speed.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

A preferred embodiment of the present invention will hereinafter be described in detail with reference to the accompanying drawings.

Figure 1:
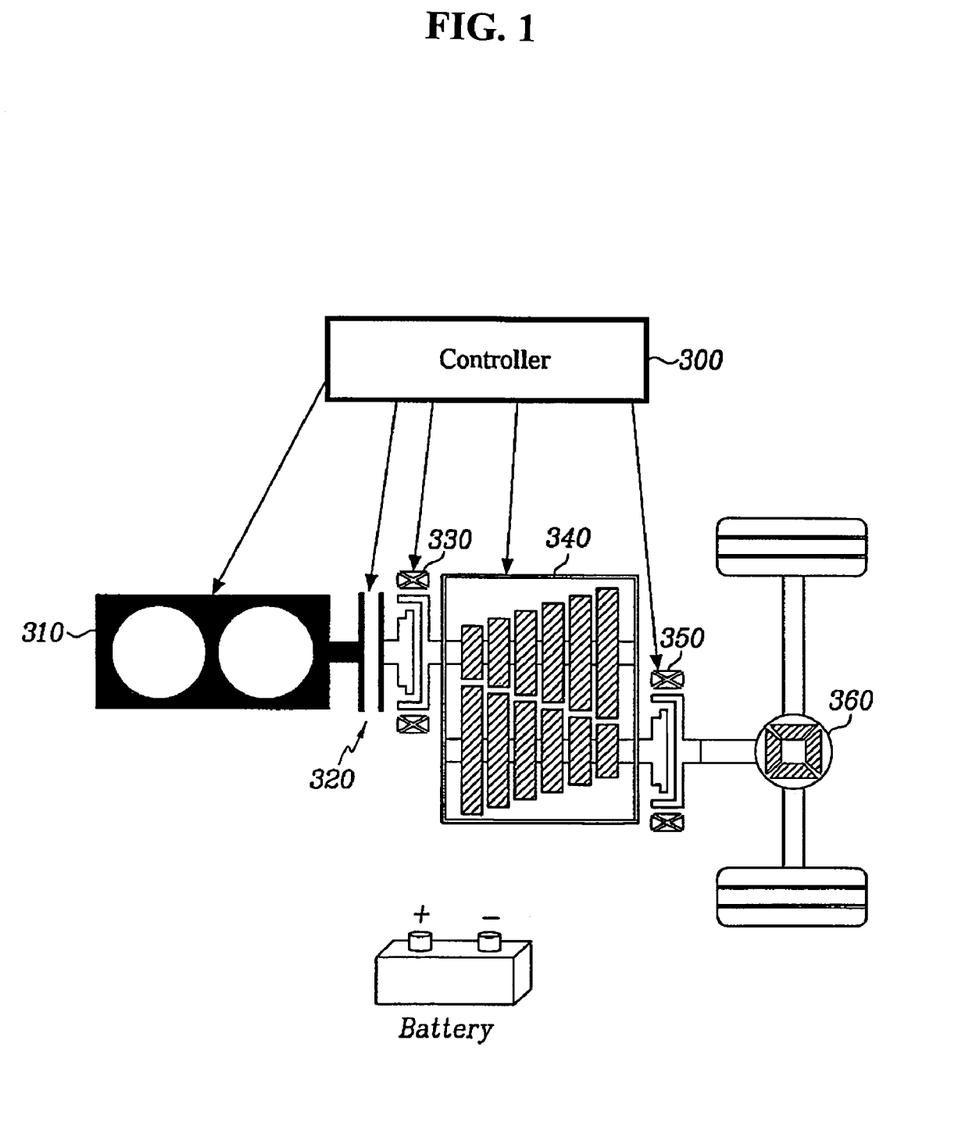
FIG. 1 is a schematic diagram of a powertrain system of a hybrid electric vehicle according to an embodiment of the present invention.

As shown in FIG. 1, a powertrain system of a hybrid electric vehicle according to an embodiment of the present invention includes an engine 310, a clutch 320, primary and secondary motors 330 and 350, an automated shift gearbox (ASG) 340, and a differential gearbox 360. A controller 300 controls shift operation via control of the engine 310, the clutch 320, the primary and secondary motors 330 and 350, and the ASG 340. Engine 310 may be an internal combustion engine and primary and secondary motors 330, 350 are preferably electric motors. The controller 300 can be realized by one or more processors activated by a predetermined program, and the predetermined program can be a set of instructions to form an algorithm for a shift operation according to a preferred embodiment of this invention.

The ASG 340 is a transmission that has a manual-transmission-based gear mechanism, and its gear engagement/disengagement is controlled by a controller. Such an ASG is well understood by persons of ordinary skill in the art. The ASG 340 is connected to the engine 310 via the clutch 320. The primary motor 330 is interposed between an output shaft of the clutch 320 and an input shaft of the ASG 340. The secondary motor 350 is interposed between an output shaft of the ASG 340 and an input shaft of the differential gearbox 360.

Therefore, the primary motor 330 can apply its motor torque to the input shaft of the ASG 340 under the control of the controller 300. In addition, the secondary motor 350 can apply its motor torque to the output shaft of the ASG 340 (i.e., the input shaft of the differential gearbox 360) under the control of the controller 300.

An algorithm for shift operation adaptable for such a powertrain system of an HEV according to an embodiment is as follows.

A shift point is preferably determined on the basis of a conventional shift scheme. That is, according to a predetermined shift pattern, an upshift/downshift point is determined on the basis of a throttle valve opening controlled by an accelerator pedal operation of a driver, a current vehicle speed, and a current shift-speed.

A conventional shift pattern may be used as the shift pattern according to the present embodiment if capacities of the motors 330 and 350 are relatively small as in when the engine 310 is a diesel engine. When capacities of the motors 330 and 350 are relatively large or when the engine 310 is a gasoline engine, a shift pattern modified from a conventional one under consideration of load leveling may be used as the shift pattern according to the present embodiment.

A shift operation according to a present embodiment is hereinafter described in detail.

The controller 300 starts the shift operation when a shift point such as an upshift or a downshift point is determined. When the shift operation is started, the controller 300 disengages the clutch 320, and at the same time, controls an output torque of the engine 310 such that the output torque lies within a predetermined torque capacity of the clutch 320.

The controller 300 then respectively controls the primary and secondary motors 330 and 350 such that a power requested by a driver (e.g., by operation of an accelerator pedal) may be transmitted to the input shaft of the differential gearbox 360.

When the clutch 320 is fully disengaged, the controller 300 controls rotation speed of the engine 310 such that it is synchronized with the rotation speed of the output shaft of the clutch 320 at a next shift-speed (i.e., a target shift-speed), i.e., such that a speed difference between both ends of the clutch 320 is reduced below a target difference.

When the clutch 320 is fully disengaged, the controller 300 disengages a current shift-speed. The disengagement of the current shift-speed may be realized by disengaging synchronizers for the current shift-speed e.g., by use of a shift actuator.

When the current shift-speed is fully disengaged, the controller 300 controls the rotation speed of the input shaft of the ASG 340 using the primary motor 330 such that the rotation speed of the input shaft of the ASG 340 is synchronized with one at the target shift-speed. The controller 300 then controls the secondary motor 350 such that the secondary motor 350 realizes its output power as close as possible to the required power requested by the driver. An output power of the vehicle is thereby prevented from becoming zero (0).

When the disengagement of the current shift-speed is completed and the rotation speed of the input shaft of the ASG 340 is synchronized with the rotation speed at the target shift-speed, the controller 300 engages the next shift-speed (i.e., the target shift-speed) of the ASG 340. The engagement of the target shift-speed may be realized by engaging synchronizers for the target shift-speed e.g., by use of a shift actuator. During this operation, the controller 300 continues its controlling of the engine 310 regarding the revolution speed thereof.

When the target shift-speed is engaged and the rotation speed of the engine 310 is synchronized with the rotation speed of the output shaft of the clutch 320 at a target shift-speed, the controller 300 engages the clutch 320, which finishes the shift operation.

The shift operation described above is described in further detail with respect to a 1→2 upshift with reference to FIGS. 2–6.

Shift operations between different shift-speeds are the same as will be described with respect to the 1→2 upshift, as will be apparent to a person of ordinary skill in the art from the description below.

Figure 2:
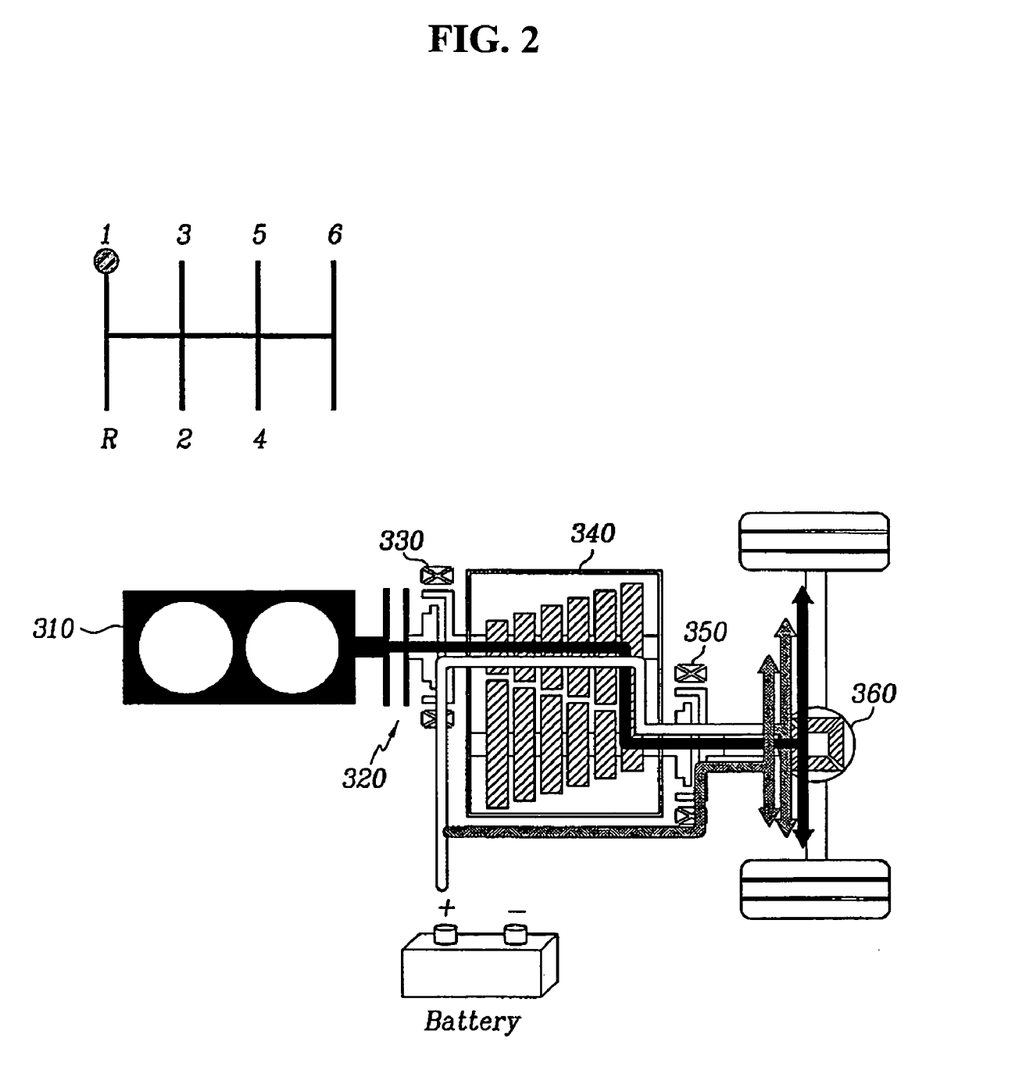
FIG. 2 illustrates a normal drive mode of a powertrain system of a hybrid electric vehicle according to an embodiment of the present invention.

A normal drive mode of a powertrain system of a hybrid electric vehicle according to an embodiment of the present invention is hereinafter described with reference to FIG. 2.

In the normal drive mode, power of the engine 310 and of the primary and secondary motors 330 and 350 is used. During the normal drive mode, the controller 300 starts the shift operation when a shift point such as an upshift or a downshift point is determined.

Figure 3:
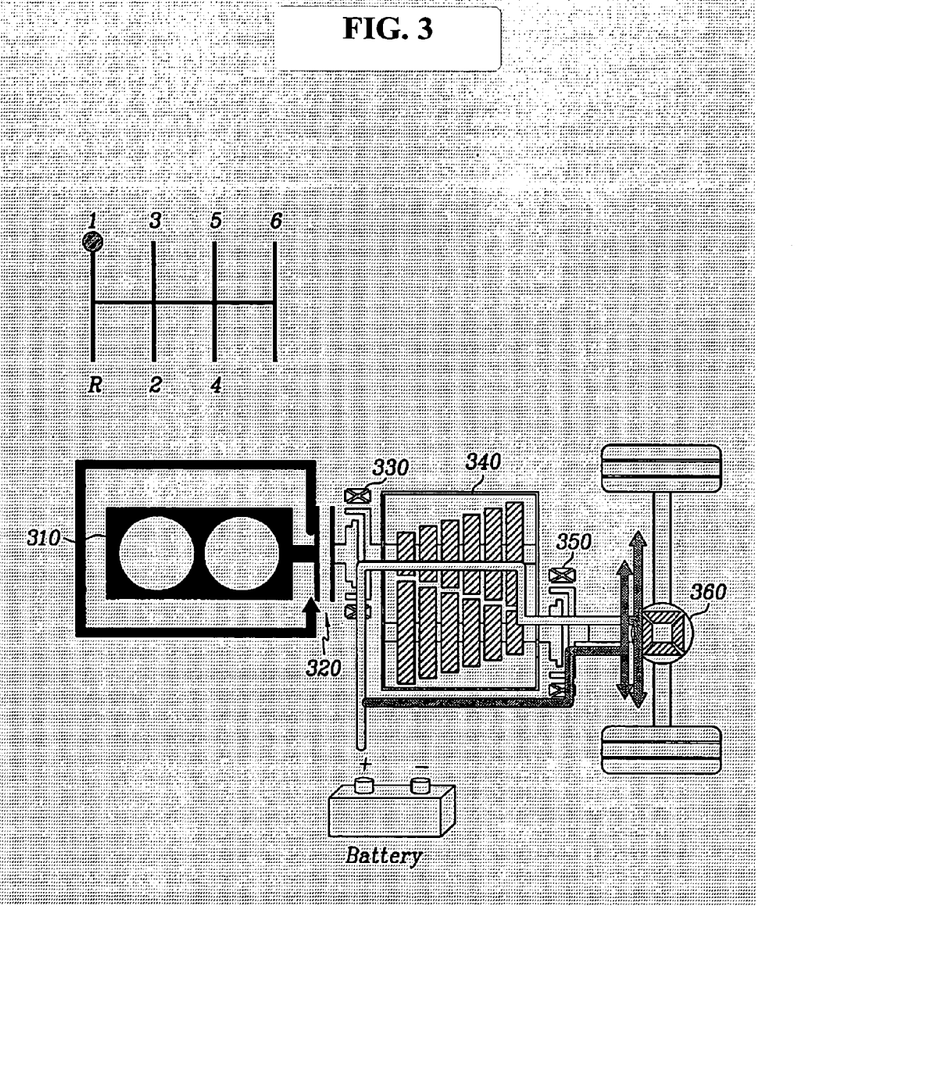
FIG. 3 illustrates a clutch disengagement mode of a powertrain system of a hybrid electric vehicle according to an embodiment of the present invention.

A clutch disengagement mode of a powertrain system of a hybrid electric vehicle according to an embodiment of the present invention is hereinafter described with reference to FIG. 3.

When the shift operation is started, the controller 300 disengages the clutch 320.

While the clutch 320 is being disengaged, the controller 300 controls an output torque of the engine 310 such that the output torque lies within a predetermined torque capacity of the clutch 320.

When the clutch 320 is fully disengaged, the controller 300 controls a rotation speed of the engine 310 such that the rotation speed of the engine 310 is synchronized with a rotation speed of the output shaft of the clutch 320 at a target shift-speed.

The controller 300 then respectively controls the primary and secondary motors 330 and 350 such that power requested by a driver may be transmitted to the input shaft of the differential gearbox 360.

Figure 4:
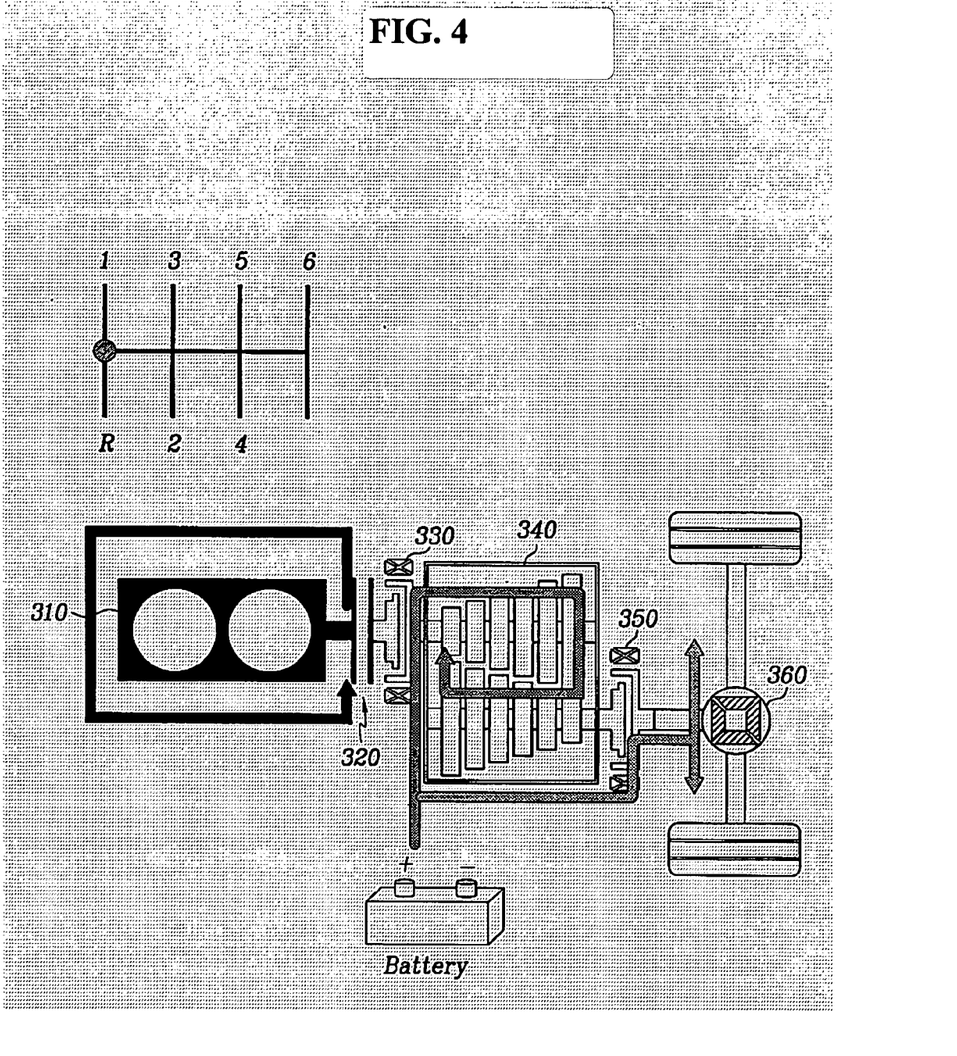
FIG. 4 illustrates a current shift-speed release mode of a powertrain system of a hybrid electric vehicle according to an embodiment of the present invention.

A current shift-speed release mode of a powertrain system of a hybrid electric vehicle according to an embodiment of the present invention is hereinafter described with reference to FIG. 4.

When the clutch 320 is fully disengaged, the controller 300 disengages a current shift-speed of the ASG 340. Therefore, the power requested by the driver is realized by the secondary motor 350 only.

When the current shift-speed is fully disengaged, the controller 300 controls a rotation speed of the input shaft of the ASG 340 using the primary motor 330 such that the rotation speed of the input shaft of the ASG 340 is synchronized with a rotation speed at the target shift-speed.

During this operation, the controller 300 continues its controlling of the engine 310 regarding the revolution speed thereof.

Figure 5:
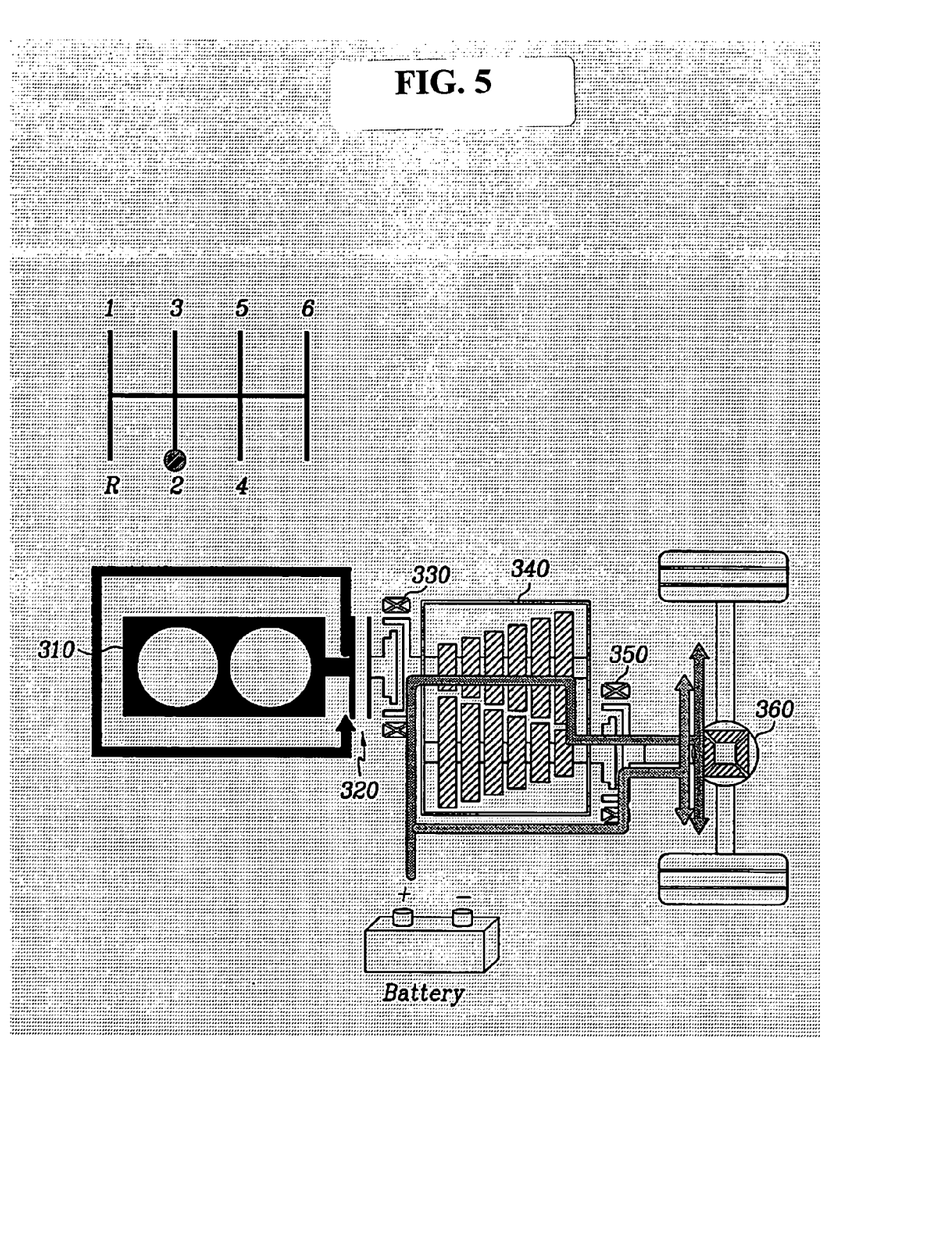
FIG. 5 illustrates a target shift-speed engagement mode of a powertrain system of a hybrid electric vehicle according to an embodiment of the present invention.

A target shift-speed engagement mode of a powertrain system of a hybrid electric vehicle according to an embodiment of the present invention is hereinafter described with reference to FIG. 5.

When the rotation speed of the input shaft of the ASG 340 is synchronized with the rotation speed at the target shift-speed, the controller 300 engages the target shift-speed of the ASG 340.

The controller 300 then realizes the requested power using the primary and secondary motors 330 and 350 and outputs the power through the input shaft of the differential gearbox 360.

During this operation, the controller 300 continues its controlling of the engine 310 regarding the revolution speed thereof.

Figure 6:
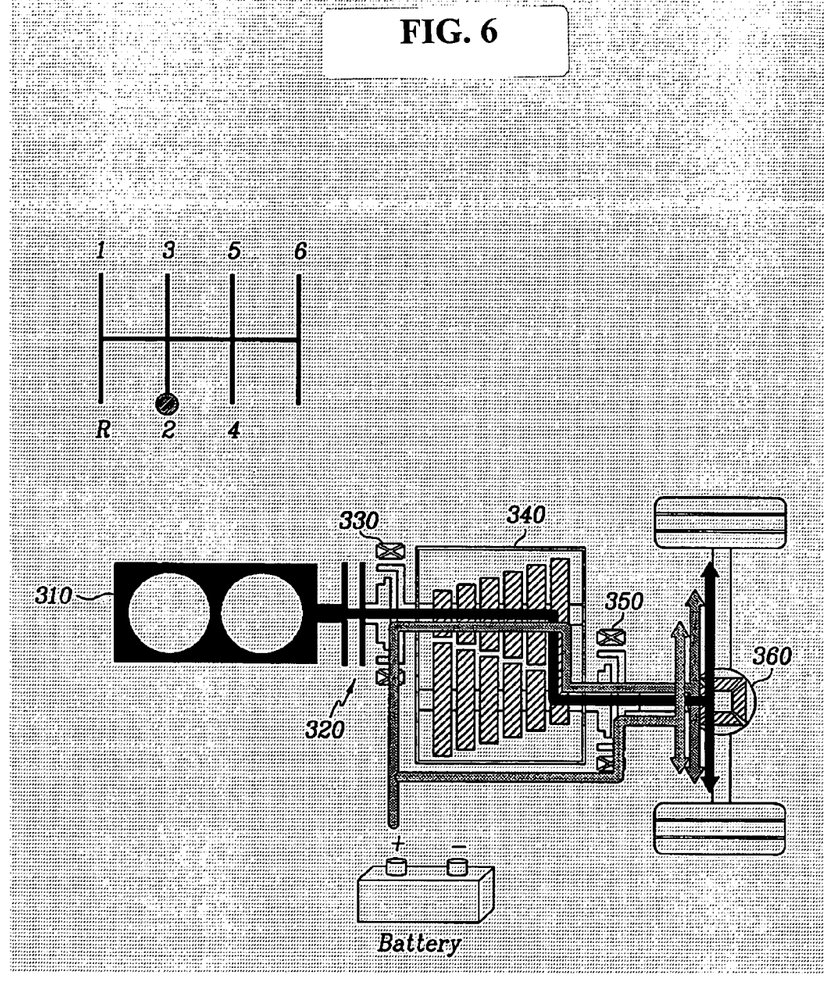
FIG. 6 illustrates a shift finishing mode of a powertrain system of a hybrid electric vehicle according to an embodiment of the present invention.

A shift finishing mode of a powertrain system of a hybrid electric vehicle according to an embodiment of the present invention is hereinafter described with reference to FIG. 6.

When the target shift-speed is engaged and rotation speeds of both ends of the clutch 320 are synchronized with each other, the controller 300 engages the clutch 320. During the engagement of the clutch 320, the controller 300 realizes the requested power using the primary and secondary motors 330 and 350 and outputs the power through the input shaft of the differential gearbox 360.

By the engagement of the clutch 320, the shift operation is finished, and after finishing the shifting operation, the controller 300 realizes the requested power using the engine 310, and the primary and secondary motors 330 and 350, and outputs the power through the input shaft of the differential gearbox 360.

As described herein, a powertrain system of an HEV according to an embodiment of the present invention has the following merits.

A torque capacity required for the clutch is reduced since two motors are disposed after the clutch.

Shift-shock during engagement of a target shift-speed is reduced by controlling the two motors.

Power output is maintained by the primary and/or secondary motors in the case that the power of the engine is not transmitted through the clutch due to disengagement thereof.

Power output is maintained by the secondary motor in the case that the power is transmitted from neither the engine nor the primary motor.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A powertrain system of a hybrid electric vehicle (HEV), comprising:
    an engine;
    a clutch;
    a primary motor;
    an automated shift gearbox (ASG) connected to the engine through the clutch;
    a secondary motor; and
    a differential gearbox,
    wherein the primary motor is disposed between an output shaft of the clutch and an input shaft of the ASG, and the secondary motor is disposed between an output shaft of the ASG and an input shaft of the differential gearbox, further comprising a controller executing a shift operation by controlling the engine, the clutch, the primary and secondary motors, and the ASG,
    wherein the controller adjusts outputs of the engine and the primary and secondary motors during the shift operation, wherein the controller executes a clutch disengagement mode during the shift operation, the clutch disengagement mode comprising:
    controlling an output torque of the engine during a disengagement of the clutch such that the output torque of the engine lies within a predetermined torque capacity of the clutch;
    controlling a rotation speed of the engine after the disengagement of the clutch such that the rotation speed of the engine is synchronized with a rotation speed of the output shaft of the clutch at a target shift-speed; and
    controlling the primary and secondary motor such that a required torque is output through the input shaft of the differential gearbox.

2. The powertrain system of claim 1, wherein the controller executes a current shift-speed release mode during the shift operation, the current shift-speed release mode comprising:
   disengaging a current shift-speed of the ASG after the disengagement of the clutch; and
   controlling, when the current shift-speed is disengaged, a rotation speed of the input shaft of the ASG using the primary motor such that the rotation speed of the input shaft of the ASG is synchronized with one at the target shift-speed.

3. The powertrain system of claim 2, wherein the controller executes a target shift-speed engagement mode during the shift operation, the target shift-speed engagement mode comprising:
   engaging the target shift-speed after the rotation speed of the input shaft of the ASG is synchronized with the one at the target shift-speed; and
   controlling, after the engaging the target shift-speed, the primary and secondary motors such that the required torque is output through the input shaft of the differential gearbox.

4. The powertrain system of claim 3, wherein the controller executes a shift finishing mode during the shift operation, the shift finishing mode comprising engaging the clutch after the target shift-speed is engaged and the rotation speed of the engine is synchronized with the rotation speed of the output shaft of the clutch at a target shift-speed.

5. A powertrain system for a hybrid electric vehicle, comprising:
   an internal combustion engine
   a first clutch receiving power from said engine;
   an automated shift gearbox receiving power from said clutch;
   a first electric motor disposed in said powertrain between said clutch and said gearbox;
   a differential receiving power from said gearbox; and
   a second electric motor disposed in said powertrain between said gearbox and said differential, further comprising a controller programmed with instructions for controlling said engine, clutch, motors and automated shift gearbox wherein said instructions comprise instructions for:
   adjusting outputs of said engine and motors during a shift operation;
   executing a clutch disengagement during said shift operation;
   executing a current shift-speed release during said shift operation;
   executing a target shift-speed engagement during said shift operation; and
   executing a shift finish during said shift operation,
   wherein said clutch disengagement instructions comprise:
   controlling an output torque of the engine during disengagement of the clutch such that the output torque of the engine lies within a predetermined torque capacity of the clutch;
   controlling rotation speed of the engine after disengagement of the clutch such that engine rotation speed is synchronized with clutch output rotation speed; and
   controlling the primary and secondary motors such that a required torque is output to the differential.

* * * * *